March 14, 1950  E. H. GREIBACH  2,500,541
INERTIA-TYPE ELECTROMECHANICAL
SOUND TRANSDUCING DEVICE
Filed July 18, 1945  7 Sheets-Sheet 1
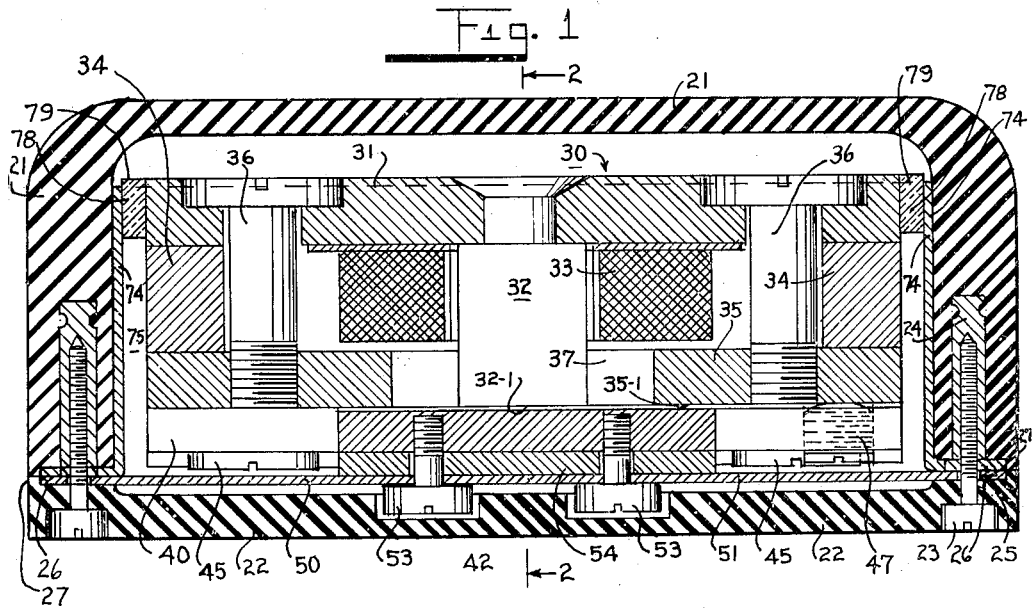
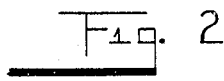
INVENTOR.
E. H. GREIBACH
BY
Pineles & Greene
ATTORNEYS March 14, 1950 E. H. GREIBACH 2,500,541
INERTIA-TYPE ELECTROMECHANICAL
SOUND TRANSDUCING DEVICE
Filed July 18, 1945 7 Sheets-Sheet 2
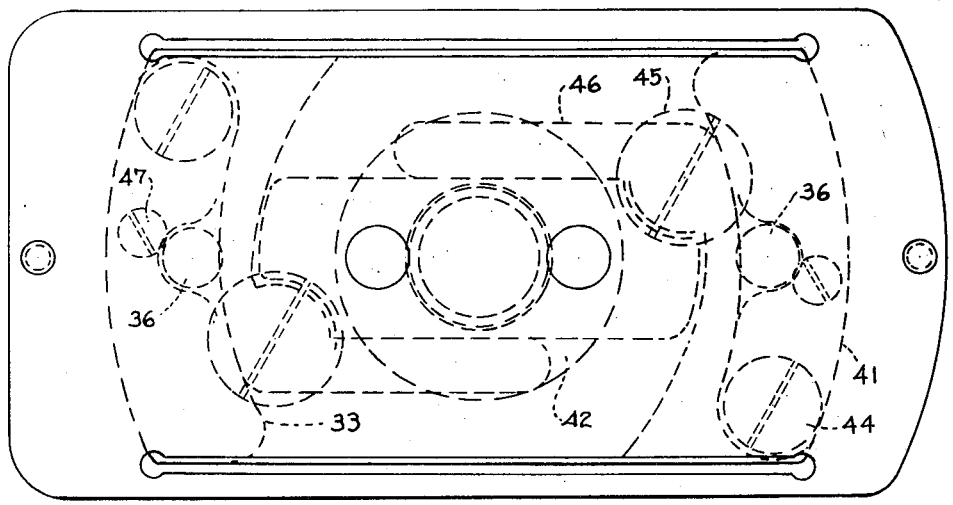
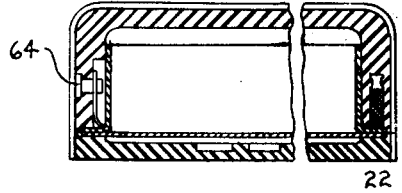
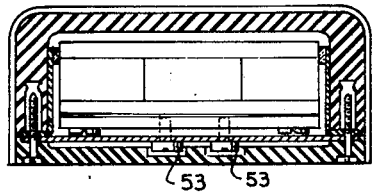
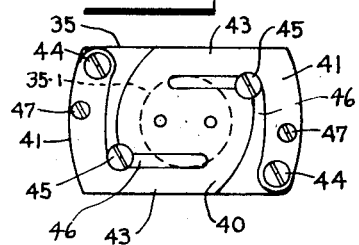
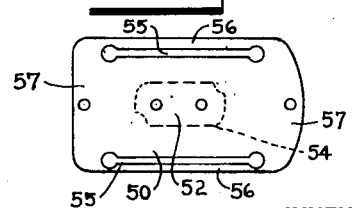
INVENTOR.
E. H. GREIBACH
BY
ATTORNEYS March 14, 1950
E. H. GREIBACH
2,500,541
INERTIA-TYPE ELECTROMECHANICAL
SOUND TRANSDUCING DEVICE
Filed July 18, 1945
7 Sheets-Sheet 3
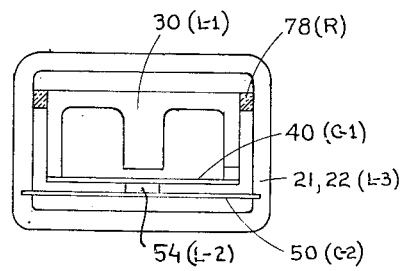
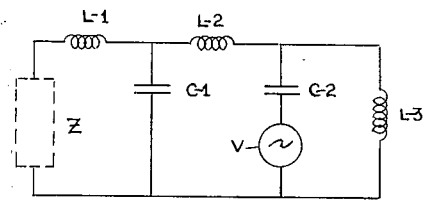
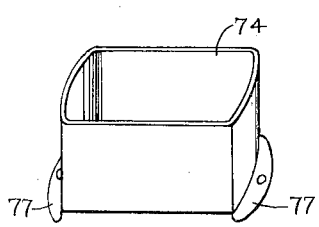
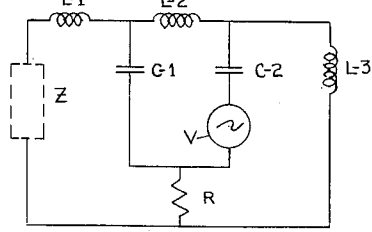
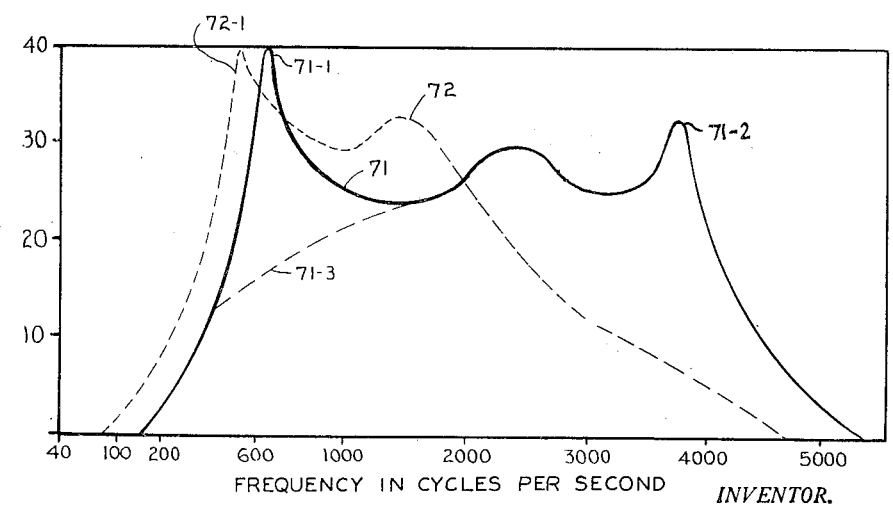
INVENTOR.
E. H. GREIBACH
BY
Pineles & Greene
ATTORNEYS

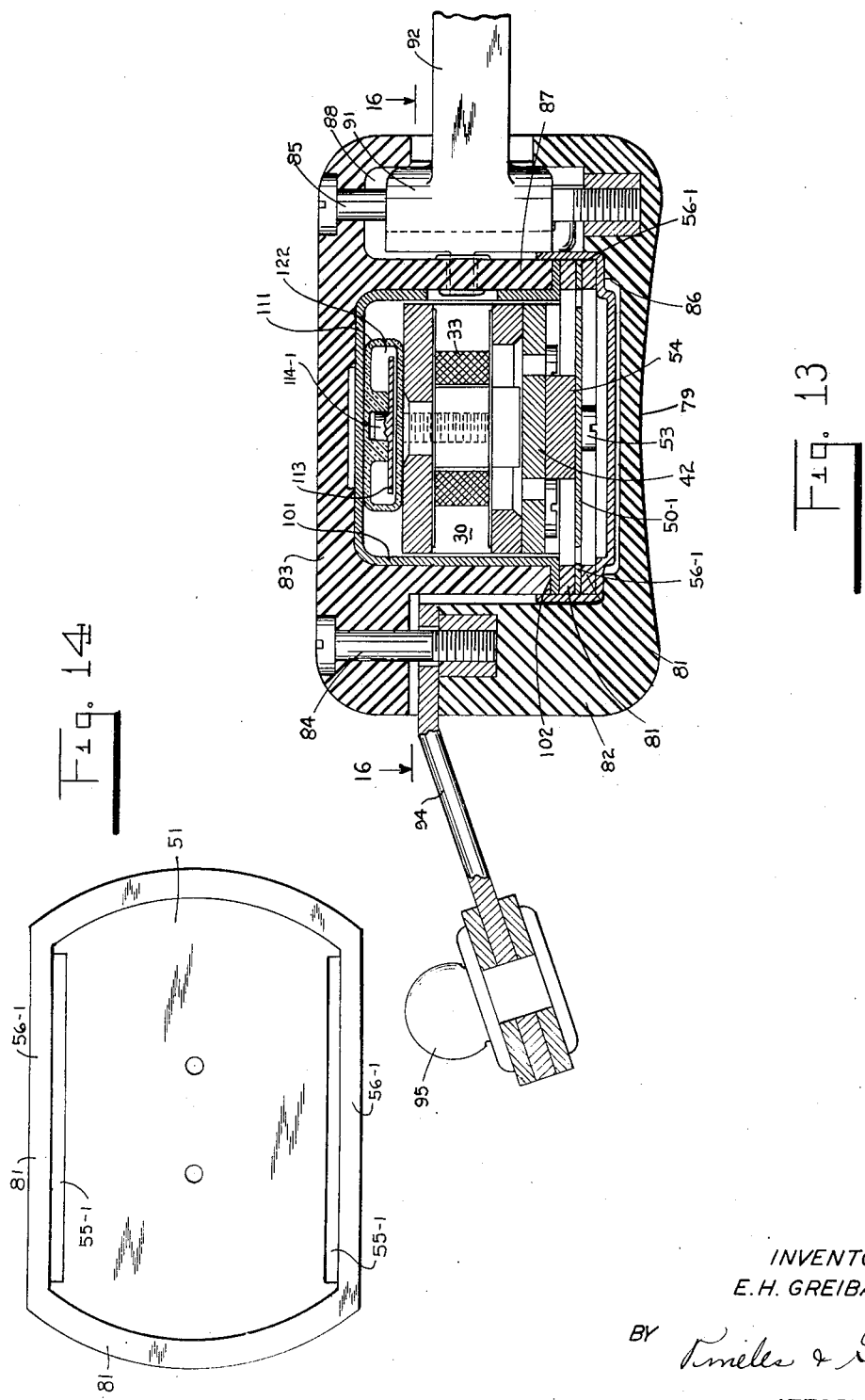

March 14, 1950     E. H. GREIBACH     2,500,541
INERTIA-TYPE ELECTROMECHANICAL
SOUND TRANSDUCING DEVICE Filed July 18, 1945     7 Sheets-Sheet 5

INVENTOR.
E. H. GREIBACH
BY
Pineles & Greene
ATTORNEYS

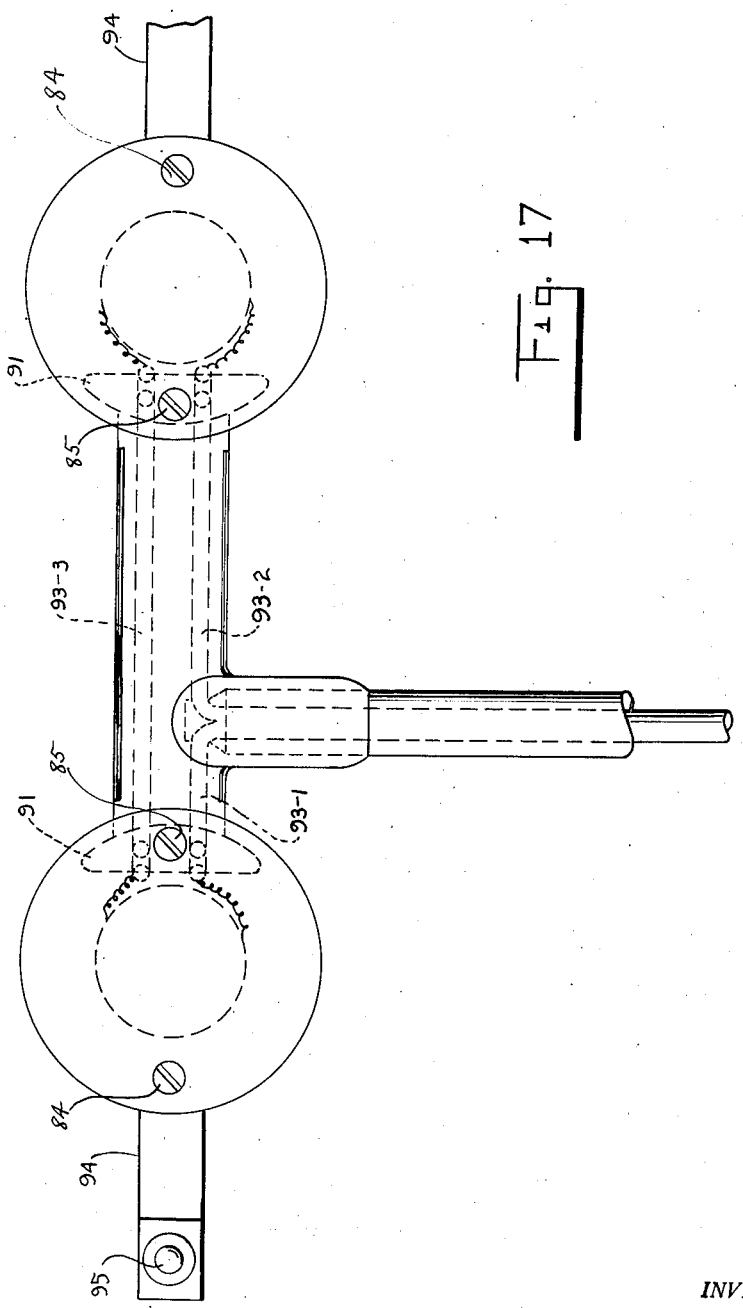

March 14, 1950 E. H. GREIBACH 2,500,541
INERTIA-TYPE ELECTROMECHANICAL
SOUND TRANSDUCING DEVICE
Filed July 18, 1945 7 Sheets-Sheet 7
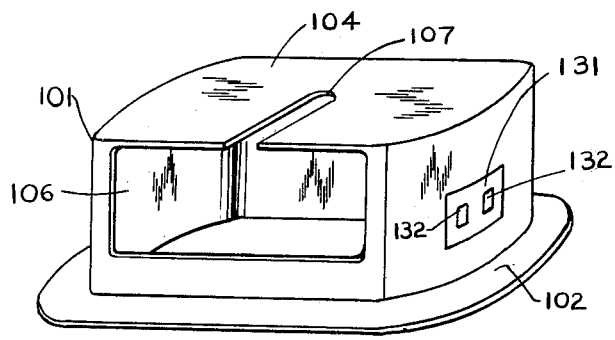
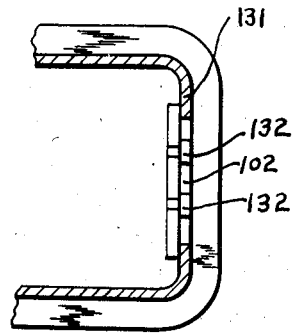
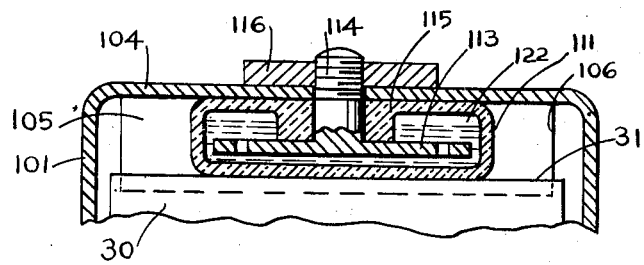
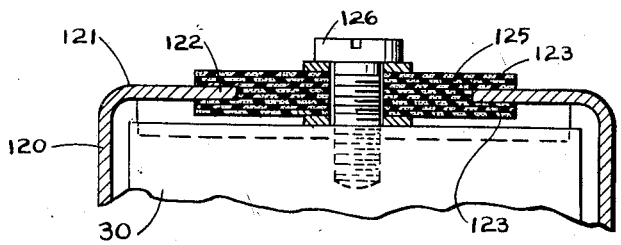
INVENTOR.
E. H. GREIBACH
BY
ATTORNEYS Patented Mar. 14, 1950

2,500,541

UNITED STATES PATENT OFFICE 2,500,541

INERTIA-TYPE ELECTROMECHANICAL SOUND TRANSDUCING DEVICE

Emil H. Greibach, White Plains, N. Y.

Application July 18, 1945, Serial No. 605,767

8 Claims. (Cl. 179—107)

This invention relates to electromechanical energy translating devices, and more particularly to electromechanical energy translating devices of the inertia reaction type, such as inertia reaction bone receivers described in my Patent Re. 21,030, or inertia reaction throat microphones described in my Patents 2,255,249 and 2,255,250.

In such devices, a vibratory contact portion, usually in the form of a completely closed casing which is held coupled to the body of the user, is connected through resilient junction elements to an additional mass portion so that the additional mass portion is resiliently carried in a vibratory condition by the contact portion; the additional mass portion constituting in conjunction with the mass of the contact portion and their interconnecting resilient junction elements parts of a magnetic core structure having a gap and windings interlinked with the magnetic flux of the core so that oscillatory voltages impressed on the winding produce corresponding vibratory motion between the mass portions of the vibrating structure for inducing hearing by bone conduction—when the contact portion is held against the bones—and that—when the contact portion is held against the throat of a speaker—the resulting vibratory motion between the mass portions of the vibratory structure across said gap will induce corresponding voltages in the windings of the device for enabling intelligible reproduction of speech.

Among the objects of the invention is a novel electromechanical energy translating device of the foregoing type which makes it possible to extend the frequency range of such devices without materially adding to their component parts or materially increasing their size.

The foregoing and other objects of the invention will be best understood from the following description of exemplifications thereof, reference being had to the accompanying drawings wherein Fig. 1 is a cross-sectional view of an electromechanical energy translating device exemplifying the invention, seen along line 1—1 of Fig. 2;

Fig. 1-A is an elevational view of the device of Fig. 1 used as a bone receiver;

Fig. 2 is a vertical cross-sectional view of the device of Fig. 1, along line 2—2 of Fig. 1, with the boundary of the casing indicated in dash lines;

Fig. 3 is a plan view of the inner vibrating structure of the device of Fig. 1, seen from the bottom side;

Fig. 4 is a cross-sectional view similar to Fig. 1 with the internal vibrating unit shown in elevation;

Fig. 5 is a cross-sectional view similar to Fig. 4 without the internal vibrating unit;

Fig. 6 is a view similar to Fig. 3 with the bottom diaphragm member removed;

Fig. 7 is a plan view of the bottom diaphragm member of the device shown in Fig. 1;

Fig. 8 is a simplified diagrammatic view of the principal elements of the device shown in Fig. 1;

Fig. 9 is an electric analog of the device of Fig. 8;

Fig. 10 is a curve diagram showing the response characteristics of the device of Fig. 1 when used as a throat microphone;

Fig. 11 is an electric analog of the device of Fig. 1 when operating with a damping resistance element;

Fig. 12 is a perspective view of an inner shell element of the device of Fig. 1;

Fig. 13 is a cross-sectional view of a modified form of a device of the type shown in Fig. 1 designed for operation with a throat microphone;

Fig. 14 is a plan view of the bottom or outer diaphragm of the device of Fig. 13;

Fig. 17 is a plan view showing two throat microphone units of Figs. 13 and 15 joined in a double microphone unit;

Fig. 18 is a view similar to Fig. 12 of an inner shell for such microphone;

Figure 15:
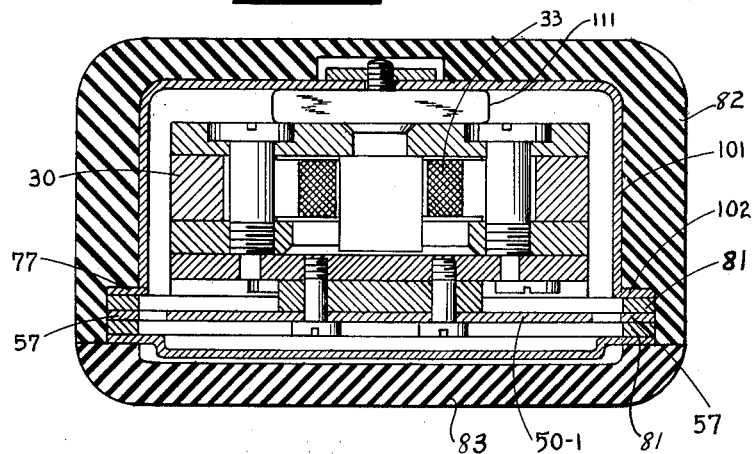
Fig. 15 is a cross-sectional view similar to Fig. 1 of the device of Fig. 13, along line 15—15 of Fig. 16.

Fig. 18-A is a cross-sectional view of the shell of Fig. 18; and

Figs. 19 and 20 are cross-sectional views similar to Fig. 13 of two different modified forms of damping elements for such device.

In Figs. 1 to 7 is shown how the generally used commercial form of bone conduction receiver may be modified in accordance with the invention to operate with an extended frequency range.

In the form shown, it comprises a small vibrating casing 21 having a detachable base 22 and enclosing within its interior all the movable elements constituting with the casing an electromechanical energy translating device of the invention, the casing forming the contact wall portion of the device. The base 22 is shown attached to the casing 21 by two screws 23, the heads of which are confined within recesses formed on the outer surface of the base wall 22, the screws engaging the internally threaded bushings 24 embedded in the end walls of the casing 21 which is made of a molded synthetic resin material of the type which gives the casing the required degree of rigidity.

Within the casing is mounted an electromagnetic vibrating unit comprising a magnetic core structure 30 and an armature diaphragm 40. The magnetic core structure 30 comprises an oblong magnetic yoke or junction plate 31, to the center of which is secured, as by a rivet connection, a cylindrical pole piece 32 which is surrounded by operating windings in the form of a coil 33. Two permanent magnet core blocks 34 are held clamped to the end regions of the oblong yoke 31 by a magnetic pole plate 35 of the same oblong shape which is shown secured to the yoke by two screws 36, the flat heads of which are confined within recesses formed on the outer surface of the yoke plate. The pole plate 35 has a central circular opening 37 separating its circular pole face region 35—1 from the circular pole face region 32—1 of the central pole piece 32.

To the outwardly facing two end regions of the pole plate 35 are secured the end arm portions 41 of an armature diaphragm, generally designated 40, having an intermediate armature portion 42 which overlaps the entire pole face region 32—1 of the central pole piece 32 as well as an extensive area of the pole face 35—1 of the surrounding pole plate 35 so that the armature shall provide a path for the closed magnetic circuit extending from the central region of the armature across the gap to the pole face 32—1 of the central pole piece, then through the yoke plate to the two parallel magnetic path branches formed by the two permanent magnet cores 34, the return path being completed by the yoke plate 35 and the gap separating its pole surface area 35—1 from the facing area of the armature 42.

As shown in Fig. 6, the pole face area 35—1 of the outer pole plate, overlapped by the intermediate armature portion 42 of the diaphragm, is substantially larger than the pole face area 32—1 of the central pole piece so that the principal magnetic forces exerted between the armature and the larger magnetic core structure are exerted only across the gap space separating the central pole face area 32—1 of the pole piece from the armature, thereby assuring that slight misalignment of the armature relatively to the magnetic structure of the pole pieces does not materially affect the operating characteristics of the device.

As shown in Figs. 1 to 6, the diaphragm armature 40 is formed of a magnetic sheet member of substantial thickness which is shaped somewhat like an S. Notwithstanding the small overall dimensions of the diaphragm armature 40 and its substantial thickness, it is given the desired limited stiffness—determined by the resonant frequency at which it has to operate in the device—by joining each of the diaphragm end arms 41 to a region of the armature facing the other end arm through an intermediate arm section 43 extending on the opposite sides of the elongated armature portion 42 from the end regions of the armature.

The end portions of the two end arms 41 of the armature diaphragm are shown affixed to the pole plate by two screws 44. Two stop screws 45 having heads—overlying intermediate portions of the diaphragm armature arms 41, 43 and shanks extending through the slots 46 separating the diaphragm arms from the armature into engagement with threaded holes formed in the pole plate—are so adjusted that the heads of the stop screws limit the maximum deformation that can be imparted to a diaphragm arm so that the strain to which it is subjected remains within the elastic limits of Hooke's law.

As shown in Figs. 1, 2 and 6, two set screws 47 extending through threaded holes in a part of each diaphragm arm 41 near the clamping end thereof which is affixed to the pole plate 35 by screws 44, make it possible to adjustably set in a simple manner the small gap spacing of the order of a few mils which has to be maintained between the pole faces and the facing surface of the armature 42. The elements of the magnetic vibrating structure thus far described are identical with those employed in the now generally used small bone conduction receivers.

In accordance with the invention, the armature of such vibrating unit is joined to the contact wall structure through an additional vibratory diaphragm member, such as shown at 50, of a stiffness much greater than the stiffness of the diaphragm member of such vibratory unit, so as to extend the frequency range over which such device operates with a high efficiency, without materially adding to the component parts of such device or materially increasing the size of the device.

As indicated in Fig. 7, the additional diaphragm 50 shown is made of a flat, relatively thin, sheet stock of elastic spring metal. Its central portion 52 is secured to the central armature portion 42 of the armature diaphragm 40 either by spot welding or by two screws 53, as shown, across an additional spacer and mass element 54.

The central portion 52 of the additional diaphragm 50, which is secured to the magnetic armature 42, forms with it and the spacer mass element 54 a substantially rigid mass element joining the two diaphragms 40 and 50, and is surrounded by a continuous border region of thin elastic sheet material extending around the entire periphery of this intermediate mass element. The additional diaphragm 50 is of an oblong configuration and its thin elastic region surrounding its center portion 52 is provided with two elongated slits 55 separating the elongated border edges 56 of the diaphragm from the main intermediate body portion of the diaphragm so that the elongated intermediate main body portion of the diaphragm extending between the two slits 55 may vibrate relatively to the edge regions 56 and 57 of the diaphragm 50.

In order to give the additional diaphragm 50 the required degree of stiffness, its two end regions 57 and its two border regions 56 are rendered substantially rigid so that they are restrained against elastic deformation by bending in the direction transverse to the diaphragm and by stretching in the direction of elongated border regions 56.

In the arrangement shown in Figs. 1 to 7, the edge regions 56, 57 of the diaphragm 50 are given the required rigidity and are restrained against deformation by holding them all clamped between facing border regions of the two casing walls 21, 22.

As indicated in Figs. 1, 2, 4, and 5, the base wall 22 is provided with a slightly raised border portion 25 of substantially the same thickness as the facing border region of the casing wall 21 to which it is clamped. The border portion 25 of the casing wall 22 has formed therein a recess 26 bounded by a flange 27, the recess 26 being just deep enough for receiving the edge elements 56, 57 of the diaphragm and to ensure that the entire edge region of the additional diaphragm 50 is held positively clamped and restrained against deformation when the two casing walls are fixed to each other in their assembled condition by the screws 23.

The clamping connection between the edge regions of the additional diaphragm 50 with the casing walls 21, 22, serves thus as the sole connection of the casing walls to the elastic portions of the diaphragm 50 through which the inner vibratory unit is resiliently carried in a vibratory condition in the interior of the casing structure.

The device of the invention shown in Figs. 1 to 7 is or about the same compact size as the standard bone receivers which are now on the market, the height being increased only by about 1/32 of an inch, represented by the thickness of the additional diaphragm 50.

The effect of the additional diaphragm on the operation of the inertia reaction device of the invention may be understood from Figs. 8 to 11, inclusive. Fig. 8 shows diagrammatically the general arrangement of the elements of the device of Figs. 1 to 7 and Fig. 9 represents its electrical analog.

When a device shown diagrammatically in Fig. 8 is used as a bone receiver, the voltage applied to the actuating coil of the device, or the vibratory forces acting across the magnetic gap of the core structure are represented in the analog of Fig. 9 by voltage source V, and the electric voltage developed across the impedance Z represents the forces exerted by the contact wall on the bone structure. When a device of Fig. 8 is used as a throat microphone, a voltage applied across the terminals of element Z represents the forces exerted by the throat on the contact wall of the device of Fig. 8, and the voltage developed across element V represents the output of the microphone.

In Fig. 10, the full line curve 71 shows the frequency response of a device of the invention, such as shown in Fig. 8, when used as a throat microphone under the action of constant velocity vibratory forces imparted to the contact wall casing by an artificial throat. The dash-line curve 72 of Fig. 10 shows the corresponding response characteristic of a device having the same components as Fig. 8, but without the additional diaphragm 50, and with the center portion of the inner diaphragm 40 directly connected to a portion of the contact casing 21, 22, the peaked region 72—1 of the response curve 72 corresponding to the resonant frequency of such vibratory device. The device of the invention exhibits also similar marked superiority in performance when used as a bone receiver.

When a device of the type shown in Fig. 8, but without the additional diaphragm 50, is used as a contact microphone, such as a throat microphone, and is subjected to constant velocity vibratory forces imparted to the contact casing, it will generate a voltage which rises with the frequency at the rate of about twelve decibels per octave, in the part of the frequency below the resonant frequency of the vibratory structure. Since the housing is not absolutely rigid, it introduces resonant peaks and dips at relatively high frequencies.

By providing such device with the additional diaphragm arrangement of the invention, its vibrating system is made to operate with two resonant frequencies in the manner indicated by curve 71 in Fig. 10, namely, the low resonant frequency indicated by peak 71—1 corresponding to the resonant peak 72—1 of the device which does not have the additional diaphragm, and an additional resonant frequency in the high frequency range between about 3,000 and 4,000 cycles, indicated by peak 71—2.

The two resonant frequencies with which the device operates depend on the magnitude of the masses L—1, L—2 of the device and on the stiffness of its spring C—1, C—2. Since the additional diaphragm 50 supports the whole inner structure, it can be made very stiff so that the higher resonant frequency shall be in the range between about 3,000 and 4,000 cycles which is desirable for securing high intelligibility of speech when such a device is used as a throat microphone or a hearing aid bone receiver.

In a device of the type described, it is also desirable to suppress the peak in the response characteristic caused by the low resonant frequency of its vibrating system. According to the invention, this is accomplished in a very simple and effective manner by introducing damping means between the mass of the vibrating magnetic structure 30 and the contact casing, in a manner indicated diagrammatically in Fig. 8 by mechanical resistance element R. The corresponding electric analog of such device is shown in Fig. 11. By introducing such damping resistance element between the vibrating magnet core structure 30 and the casing, the low frequency resonant peak 71—1 of the response curve 71 of such device may be suppressed and the response brought down to a level represented by the dash-dot curve portion 71—3, without reducing the effective cooperation of the elements in extending the frequency range of such devices.

The effectiveness of the damping resistance R in the operation of an inertia-reaction device of the invention may be more fully explained by reference to the electric analog of such device shown in Fig. 11. In this analog, the mesh formed by the elements L—1, C—1 and R represents the corresponding components of the device shown in Fig. 8 which determine the low resonant frequency of the system. This mesh is damped very effectively by the serially included resistance R to a degree sufficient to suppress the low frequency peak of the response curve which has a detrimental effect on the intelligibility with which the device has to operate in order to be fully effective.

On the other hand, the mesh formed by elements C—1, L—2, C—2 corresponds to the components of the device shown in Fig. 8 that determine the high frequency resonance of the system. The high frequency current in this mesh C—1, L—2, C—2 is only negligibly affected by the damping resistance R because only the voltage drop across the element C—1 can contribute to a current with a resistance loss in the mesh C—1, L—1, R and this current is very small because the inductance L—1 corresponding to the large mass of the device represents a high impedance for high frequency currents.

An electromagnetic energy translating system of the invention of the type represented by the electric analogs of Figs. 9 and 10, operates as a band-pass filter which has a given response in translating energy over the frequency band in the region between the two resonant frequency peaks 71—1, 71—2 of curve 71 (Fig. 10), the transmission of the energy being substantially cut off below and above this frequency band.

The frequency of the lower limit of the frequency band, corresponding to the lower peak 71—1, is determined by the magnitude of the mass L—1 and of the stiffness C—1 of an energy translating device of the type shown diagrammatically in Fig. 8. The upper limit of the frequency band corresponding to the resonant frequency peak 71—2 is approximately determined by the magnitude of the elements L—2, C—1 and C—2 of the energy translating unit of the type shown in Fig. 8.

By suitably proportioning and varying the ratios of L—1, L—2, C—1, C—2, the band width over which such energy translating device has a good frequency response and its cutoff frequencies, can be chosen in proportion to meet any special requirements. Thus, an energy translating device of the type shown has proved very effective for determining the null point of a bridge system used to locate mines which used an energy source of about 1000 cycles and required as a part of the measuring circuit an energy translating device which would have a good response in a limited band from about 900 to 1500 cycles per second and cut off below and above its frequency, and particularly have almost negligible sensitivity for the second harmonic frequency of 2000 cycles of the source and higher frequencies.

Figs. 1, 2 and 12 show one simple arrangement for providing such device with a damping resistance interconnected between the casing structure and the vibrating magnet structure 30. A shell 74, of thin sheet metal, such as brass for instance, is placed around the magnet structure 30 so that the walls of the shell 74 shall be separated from the outer surfaces of the magnet core structure 30 by a gap region 75. The shell 74 is affixed to the casing wall structure 21, 22 by providing the lower edges with flange portions 77, shaped to fit over the end regions 57 of the additional diaphragm 50 and be rigidly clamped therewith between the two wall members 21, 22 of the casing structure, in the manner indicated in Figs. 1 and 2. The shell 74 forms thus an extension of the casing wall structure and a fixed part of it.

In the gap region 75 between the shell 74 and the exterior surface of the magnetic core structure 30 are placed strip portions 78 of yieldable damping material, such as a very soft grade of rubbery clamping material, so that the relative vibratory motion between the magnet structure 30 and the shell 74 surrounding it shall be damped for suppressing the low resonant peak 71—1, in the manner indicated in Fig. 10.

A strip of damping material 78 may be placed in the gap 75 around the entire periphery of the yoke member 31 so that the relative vibratory motion between the magnet structure 30 and the shell 74 shall subject the material of the damping strip 78 to shear forces. The damping strip portions 78 may be retained in the gap 75 by friction, and a thin film 79 of cement may be placed over the exposed outer edge region of the strip 78 and the adjoining edge regions of the shell 74 and the yoke plate 30. Alternatively one or both surfaces of the damping strip 78 may be partially coated with a cement so as to cement surface portions of the damping strip 78 either to the shell or to the yoke 31 or to both.

A shell arrangement of the type shown makes it possible to equip the internal vibrating structure with a damping element through which its vibrating magnet core structure is connected to a rigid part of the casing structure before the internal vibrating unit is mounted in and affixed in its operative position within its contact casing structure.

Figure 16:
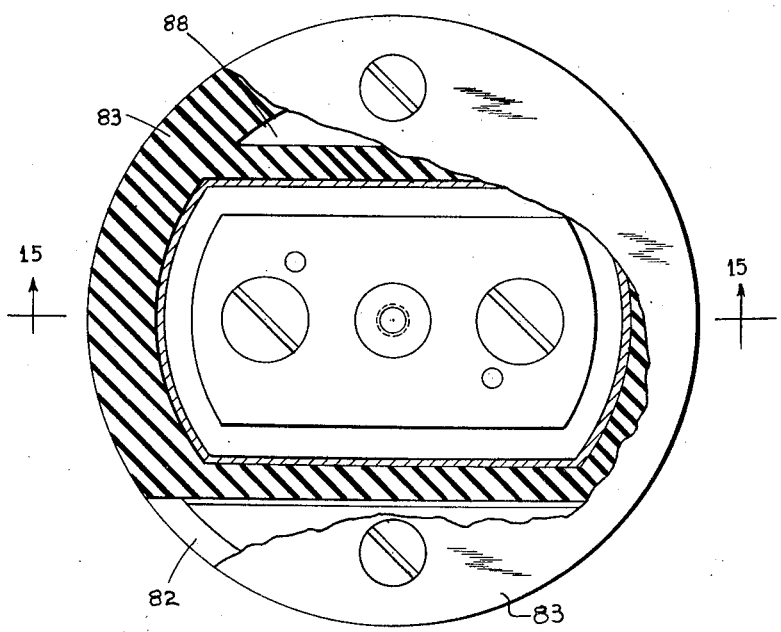
Fig. 16 is a cross-sectional view along line 16—16 of Fig. 13.

In Figs. 13 to 17 is shown another form of an inertia-reaction energy translating device of the invention specifically designed for use as a throat microphone. It has an internal electromagnetic vibrating structure including a magnetic core structure 30 and an armature diaphragm 40 similar to the corresponding elements of the device described in connection with Figs. 1 to 7. The armature portion 42 of the electric vibrating unit is joined across the spacer mass member 54 to the contact wall structure of the casing through an additional vibratory diaphragm member 50—1, as in the device of Figs. 1 to 7.

The additional diaphragm 50—1, which is shown in plan view in Fig. 14, is provided with two elongated slits 55—1 separating its central vibratory region from its elongated edge regions 56—1. The entire edge region of the thin diaphragm 50—1 is given great rigidity by uniting to one or both of its sides, as by soldering or welding, two reinforcing frame members 81, in the manner shown in Figs. 13, 15, so that only the intermediate portion of the diaphragm 50—1 extending between the two slits 55—1 serves as a vibrating part of the diaphragm.

The internal vibrating structure so formed is mounted in a central compartment of a casing structure formed of two casing wall members 82, 83 of generally circular shape which are affixed to each other by two screws 84, 85. The two casing wall members 82, 83 have facing wall sections 86, 87 arranged so as to clampingly engage the rigid edge region of the additional diaphragm 50—1 with its two reinforcing frame members 81 and hold the internal vibrating unit 30, 40 in a vibratory condition within the central compartment of the casing structure.

Casing wall member 83 has formed in the border wall region adjoining the compartment wall section 87 an additional cavity 88 within which is retained an enlarged bead member 91 of a junction strap 92 joining two similar microphone units in the manner indicated in Fig. 17. The junction strap 92 may be flexible, rubber-like material and has embedded therein electric cord leads 93—1, 93—2, 93—3 through which the operating coils of the two microphones are interconnected to external operating circuits. Each bead 91 of the connecting strap 92 is provided with terminal elements through which the terminal ends of the leads 93—1, 93—2, 93—3 are connected to the terminal ends of the operating coil of the respective microphone.

As shown in Fig. 13, each bead member 91 is held affixed within its cavity space by the clamping screw 85 of the casing, the clamping screw extending through an aperture formed in the bead member 91. The other clamping screw 84 of the two casing walls 82, 83 serves in a similar manner to hold clamped between the two walls the end of a connector strip 94, of metal, for instance, which is provided with a male fastener projection 95 for fastening thereto the female fastener element of a flexible elastic strap 96 with which a double microphone unit such as shown in Fig. 17 is retained on the neck of the speaker so that the vibration transmitting parts of the contact casings of the two microphones shall be held coupled to the vibrating parts of the throat.

The inertia-reaction device of Figs. 13 to 17 is likewise provided with damping means interconnected between the vibrating inner magnet core structure 30 and the contact wall casing structure for damping and suppressing the vibrations within the frequency range of the low frequency resonant peak of such device.

The damping means of the device shown in Figs. 13 to 17 has a shell 101, such as shown in Fig. 18, which is placed around the magnet structure 30 and is provided along its lower edges with flange portions 102 shaped to fit over the edge regions of the additional diaphragm 50—1 with its reinforcing frame members 81 so that shell flange 102 may be rigidly clamped with the diaphragm edges between the facing portions 86, 87 of the casing wall structure for holding the shell 101 fixed as part of the casing wall structure.

As shown in the enlarged detail Fig. 19, the shell 101 extends upwardly above the level of the magnet core 30 and is provided with a top wall member 104 overlying the yoke member and separated therefrom by a gap space 105. The upward portion of the shell structure 101 is provided along one side thereof with a window-like opening 106 and a transverse slot 107 extending from the opening 106 to the central region of the top wall 104 so that a damping unit 111 may be inserted through the shell opening 106 and interconnected between the upper surface of the magnet structure 30 and the top wall 104 of the shell 101. The damping unit 111 is made in the form of a flat container of thin flexible, soft synthetic resin film material which is shaped to fit into the gap space 105 between the upper shell wall 104 and the yoke plate 30. The plate member 113 extends across the interior space of the container 111 and is provided with a threaded mounting shank 114 extending through an opening in a thickened spacer wall portion 115 of the container 111 and a hole in the upper shell wall 104 so that damper plate 113 may be affixed in spaced relation to the upper shell wall 104 as by a nut 116 engaging the threaded shank 114. The interior space 112 of the container 111 is filled with a damping fluid or liquid and a plate member 113 is held immersed in the liquid filling the container space 112, so that a relative vibratory motion between the liquid in the container 111 and the damper plate 113 shall produce a substantially pure-resistance damping effect.

The damper plate 113 with its shank may be placed in the interior of the container either through the wall hole in the spacer portion 115, particularly if the container is made of rubber-like material, such as synthetic rubber or alternatively, the damper plate my be inserted through a slit in a side wall of the container which is sealed thereafter, as by an application of a cement to the border portions of the slit. The damper container 111, its damper fluid filling and the damper plate 113 are so designed that when the magnet core structure 30 vibrates relatively to the casing structure the vibratory motion of the magnet structure 30 is transmitted to the bottom wall of the container 111 and causes it to force the liquid in the container 111 to move past the surfaces of the damper plate 113 back and forth in such manner that this motion shall provide a substantially pure resistance damping effect. The shank 114 is arranged to fit tightly within the hole of the container 111 and its spacer portion 117 for assuring that when the damper unit is affixed in its position to the upper shell wall 104 the liquid in the container is tightly sealed therein. By providing the shell 101 with a side wall opening 106 and a slot 107, the damping unit may be mounted in its place after the shell is first positioned on the edge of the additional diaphragm, and affixed thereto, if desired. Alternatively, the shell 101 is merely provided with an opening in the top wall 104, in which case the damping unit 111 is first affixed in its operative position against the inner side of the top wall 104 by inserting the shank 114 through the top wall opening and clamping it with the nut 116.

Fig. 20 is an enlarged detail view similar to Fig. 19 of a modified form of damper arrangement for such device. A shell 120 similar to the shell of Fig. 18 is provided with a top wall 121 having formed therein an opening bordered by an edge region 122 which is engaged by overlapping border regions 123 of a damper element 125 which is held affixed to the vibrating inner magnet structure 30 as by a screw 126 engaging a threaded hole formed in the facing pole piece portion of the magnetic core structure 30.

The damper element 125 is made of a material which produces a damping resistance effect when it is vibrated under the action of the vibratory motion of the inner magnetic structure 30 relatively to the border portions 122 of the shell wall 121. The damper element 125 may be formed of a plurality of superposed thin sheet elements of paper or fabric having pockets of air entrapped between the adjacent superposed sheet elements so that a vibratory motion imparted to the sheet elements causes the entrapped air to be subjected to a frictional motion relative to the sheet elements.

Alternatively, the damper element 125 may be made of a synthetic resin material, such as Viscoloid, which is soft and yieldable and which has entrapped therein air pockets so that when the magnetic structure 30 vibrates relatively to the shell wall 121 the corresponding vibratory motion imparted to the damper element 125 will cause it to act as a damping resistance.

In accordance with the invention, a shell such as the shell 101 shown in Fig. 18 forming part of the damping structure, is affixed to the edge region of the additional diaphragm 50 before the internal vibrating unit is affixed in its position within the casing; and one of the end walls of the shell is provided with a terminal block 131 having mounted thereon exposed electrically conducting terminal elements 132 to which the ends of the coil windings 33 of the device are connected; and the exposed terminal elements 132 are arranged so as to be either directly engaged by the contact plugs of a cord plug through which the coil is connected to external circuits, or the exposed terminals 132 are arranged to automatically establish electric connections with the terminal elements mounted in the facing held in the facing wall portions of the enclosing casing and arranged so that when the casing is placed over the shell the terminal elements of the casing automatically establish electric connections with the terminals 132 of the shell; the terminal elements of the casing being arranged for detachable connection with the cord plugs of a cord through which the device is connected to external circuits.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In an electromechanical energy-translating device adapted to be held coupled against a vibratory body; a vibratory contact portion adapted to be held coupled to the body; a vibratory diaphragm member having an intermediate mass portion resiliently joined to said contact portion so as to be carried thereby in a vibratory condition; an additional mass portion larger than the intermediate mass portion and resilient junction elements through which it is connected to said intermediate mass portion so that the additional mass portion is resiliently carried in a vibratory condition by said intermediate mass porton; said additional mass portion and said intermediate mass portion forming parts of a magnetic core structure separated by a gap across which they vibrate; windings interlinked with said core structure so that a relative vibratory motion between the additional and the intermediate mass portions across said gap produce corresponding voltages in said windings and that oscillatory currents impressed on said windings produce corresponding vibratory motion between said mass portions across said gap; said diaphragm member including an elastic region of thin elastic sheet material extending between the periphery of said intermediate mass portion and the border region of said diaphragm member; said diaphragm member being formed of an elastic sheet member all elements of which are substantially confined to the plane of said sheet member; and a mass portion joined to a portion of said sheet member so as to form therewith said intermediate mass portion; the elastic region of said diaphragm member being bounded by a continuous edge region extending along the border region of said diaphragm member and through which said diaphragm member is connected to said contact portion; the entire continuous edge region of said diaphragm member being held restrained against elastic deformation in substantially all directions of its sheet structure; two opposite edge regions of the diaphragm member extending on opposite sides of its intermediate mass portion being separated therefrom by elongated openings so that said intermediate mass portion may vibrate relatively to said two opposite edge regions.

2. An energy translating device as defined by claim 1 in which the contact portion forms part of a casing structure enclosing the diaphragm member and the elements of the magnetic core structure.

3. An energy translating device as claimed in claim 1, said diaphragm member being of oblong shape, and two soft opposite edge regions of said diaphragm member extending generally parallel to its longer sides, the opposite sides of its intermediate mass portion being separated therefrom by elongated slits so that the intermediate mass portion may vibrate relatively to said edge regions.

4. An energy translating device as defined by claim 1 having damping means including a damping resistance element connected between an element of the vibratory contact portion and an element of the additional mass portion so as to damp the vibratory motion of said additional mass portion relatively to said contact portion.

5. An energy translating device as defined by claim 1 in which the contact portion forms part of a casing structure enclosing the diaphragm member and the elements of the magnetic core structure, said device having damping means including a damping resistance element connected between an element of the vibratory contact portion and an element of the additional mass portion so as to damp the vibratory motion of said additional mass portion relatively to said contact portion.

6. An energy translating device as defined by claim 1 in which the contact portion forms part of a casing structure enclosing the diaphragm member and the elements of the magnetic core structure, said device having damping means including a damping resistance element connected between an element of the vibratory contact portion and an element of the additional mass portion so as to damp the vibratory motion of said additional mass portion relatively to said contact portion and in which the additinal mass portion is of a larger mass than the intermediate mass portion.

7. An energy translating device as claimed in claim 1 in which the contact portion forms part of a casing structure enclosing the diaphragm member and the elements of the magnetic core structure; said diaphragm member being of oblong shape, and two soft opposite edge regions of said diaphragm member extending generally parallel to its longer sides, the opposite sides of its intermediate mass portion being separated therefrom by elongated slits so that the intermediate mass portion may vibrate relatively to said edge regions.

8. An energy translating device as claimed in claim 1 in which the contact portion forms part of a casing structure enclosing the diaphragm member and the elements of the magnetic core structure; said diaphragm member being of oblong shape, and two soft opposite edge regions of said diaphragm member extending generally parallel to its longer sides, the opposite sides of its intermediate mass portion being separated therefrom by elongated slits so that the intermediate mass portion may vibrate relatively to said edge regions; said device having damping means including a damping resistance element connected between an element of the vibratory contact portion and an element of the additional mass portion so as to damp the vibratory motion of said additional mass portion relatively to said contact portion.

EMIL H. GREIBACH.

REFERENCES CITED

The following references are of record in the file of this patent:

UNITED STATES PATENTS

| Number | Name | Date |
|---|---|---|
| 1,517,063 | Hecht et al. | Nov. 25, 1924 |
| 1,583,416 | Moore | May 4, 1926 |
| 1,630,028 | Reynolds | May 24, 1927 |
| 1,692,868 | Rudolph | Nov. 27, 1928 |
| 2,169,806 | Lian et al. | Aug. 15, 1939 |
| 2,202,906 | Hawley | June 4, 1940 |
| 2,252,846 | Giannini et al. | Aug. 18, 1941 |
| 2,255,250 | Greibach | Sept. 9, 1941 |
| 2,358,099 | Polk | Sept. 12, 1944 |

FOREIGN PATENTS

| Number | Country | Date |
|---|---|---|
| 104,229 | Sweden | Apr. 14, 1942 |